US010412722B2

United States Patent
Feng et al.

(10) Patent No.: US 10,412,722 B2
(45) Date of Patent: *Sep. 10, 2019

(54) SEARCH SPACE FOR EPDCCH CONTROL INFORMATION IN AN OFDM-BASED MOBILE COMMUNICATION SYSTEM

(71) Applicant: Sun Patent Trust, New York, NY (US)

(72) Inventors: Sujuan Feng, Frankfurt am Main (DE); Alexander Golitschek Edler von Elbwart, Darmstadt (DE); Christian Wengerter, Kleinheubach (DE); Michael Einhaus, Darmstadt (DE)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/867,591

(22) Filed: Jan. 10, 2018

(65) Prior Publication Data

US 2018/0160408 A1 Jun. 7, 2018

Related U.S. Application Data

(63) Continuation of application No. 15/408,258, filed on Jan. 17, 2017, now Pat. No. 9,900,883, which is a (Continued)

(30) Foreign Application Priority Data

Mar. 16, 2012 (EP) ..................... 12001805

(51) Int. Cl.
*H04W 72/04* (2009.01)
*H04L 5/00* (2006.01)
(Continued)

(52) U.S. Cl.
CPC ....... *H04W 72/042* (2013.01); *H04J 11/0079* (2013.01); *H04L 5/001* (2013.01);
(Continued)

(58) Field of Classification Search
CPC .............. H04L 5/0053; H04J 11/0079; H04W 72/1263; H04W 72/00; H04W 72/0406; H04W 72/1278; H04W 28/00
See application file for complete search history.

(56) References Cited

U.S. PATENT DOCUMENTS 9,019,922 B2   4/2015   Oizumi et al.
9,143,984 B2   9/2015   Zhu et al.
(Continued)

FOREIGN PATENT DOCUMENTS

EP    2 207 271 A1    7/2010
WO    2011/074265 A1  6/2011

OTHER PUBLICATIONS

"3rd Generation Partnership Project; Technical Specification Group Radio Access Network; Evolved Universal Terrestrial Radio Access (E-UTRA); Further advancements for E-UTRA physical layer aspects (Release 9)," Technical Report, 3GPP TR 36.814 V9.0.0, Mar. 2010, 104 pages.

(Continued)

*Primary Examiner* — Warner Wong
(74) *Attorney, Agent, or Firm* — Seed IP Law Group LLP

(57) ABSTRACT

The present invention relates to a method for receiving control information within a subframe of a multi-carrier communication system supporting carrier aggregation, the method comprising the following steps performed at a receiving node: performing a blind detection for the control information within a search space by means of a first search pattern, wherein the first search pattern is one of a plurality of search patterns, each of the plurality of search patterns comprising a plurality of candidates distributed on any of a plurality of aggregation levels, and wherein the plurality of search patterns further comprises a second search pattern (Continued)

whose candidates are non-overlapping the candidates of the first search pattern on the same aggregation levels.

10 Claims, 11 Drawing Sheets

Related U.S. Application Data continuation of application No. 14/984,518, filed on Dec. 30, 2015, now Pat. No. 9,585,139, which is a continuation of application No. 14/118,204, filed as application No. PCT/EP2013/051213 on Jan. 23, 2013, now Pat. No. 9,264,193.

(51) Int. Cl.
  *H04J 11/00* (2006.01)
  *H04L 1/00* (2006.01)
(52) U.S. Cl.
  CPC .......... *H04L 5/0037* (2013.01); *H04L 5/0053* (2013.01); *H04L 1/009* (2013.01); *H04L 1/0038* (2013.01); *H04L 1/0091* (2013.01); *H04L 2001/0097* (2013.01)

(56) References Cited

U.S. PATENT DOCUMENTS

| | | | |
|---|---|---|---|
| 9,300,448 B2 | 3/2016 | Gao et al. | |
| 9,319,192 B2 | 4/2016 | Kim et al. | |
| 2009/0168922 A1 | 7/2009 | Malladi et al. | |
| 2009/0209247 A1 | 8/2009 | Lee et al. | |
| 2010/0254329 A1 | 10/2010 | Pan et al. | |
| 2010/0279628 A1* | 11/2010 | Love ..................... | H04L 5/003 455/70 |
| 2010/0290418 A1 | 11/2010 | Nishio et al. | |
| 2010/0322154 A1 | 12/2010 | Chen et al. | |
| 2011/0070845 A1 | 3/2011 | Chen et al. | |
| 2011/0083066 A1 | 4/2011 | Chung et al. | |
| 2011/0201333 A1 | 8/2011 | Kwon et al. | |
| 2011/0228724 A1 | 9/2011 | Gaal et al. | |
| 2012/0008586 A1 | 1/2012 | Kwon et al. | |
| 2012/0021756 A1 | 1/2012 | Kwon et al. | |
| 2012/0044899 A1 | 2/2012 | Kwon et al. | |
| 2012/0236814 A1 | 9/2012 | Nishio et al. | |
| 2012/0275406 A1 | 11/2012 | Ji et al. | |
| 2013/0010724 A1 | 1/2013 | Han et al. | |
| 2013/0114529 A1 | 5/2013 | Chen et al. | |
| 2013/0235812 A1 | 9/2013 | Heo et al. | |
| 2013/0242882 A1 | 9/2013 | Blankenship et al. | |
| 2013/0250906 A1* | 9/2013 | Golitschek Edler von Elbwart ............ | H04W 72/0453 370/330 |
| 2013/0286980 A1* | 10/2013 | Liao .................... | H04W 72/042 370/329 |
| 2014/0044070 A1 | 2/2014 | Chen et al. | |
| 2014/0056279 A1 | 2/2014 | Chen et al. | |
| 2014/0269595 A1 | 9/2014 | Lee et al. | |
| 2014/0301330 A1 | 10/2014 | Lee et al. | |
| 2014/0328302 A1 | 11/2014 | Park et al. | |
| 2014/0362758 A1 | 12/2014 | Lee et al. | |
| 2014/0376395 A1 | 12/2014 | Kim et al. | |
| 2015/0016408 A1 | 1/2015 | Yang et al. | |
| 2015/0289239 A1 | 10/2015 | Saito et al. | |
| 2016/0234815 A1* | 8/2016 | Chen .................... | H04W 52/04 |
| 2017/0238288 A1 | 8/2017 | Chen et al. | |

OTHER PUBLICATIONS

"3rd Generation Partnership Project; Technical Specification Group Radio Access Network; Evolved Universal Terrestrial Radio Access (E-UTRA); Physical Channels and Modulation (Release 10)," Technical Specification, 3GPP TS 36.211 V10.2.0, Jun. 2011, 103 pages.
"3rd Generation Partnership Project; Technical Specification Group Radio Access Network; Evolved Universal Terrestrial Radio Access (E-UTRA); Multiplexing and channel coding (Release 10)," Technical Specification, 3GPP TS 36.212 V10.2.0, Jun. 2011, 78 pages.
"3rd Generation Partnership Project; Technical Specification Group Radio Access Network; Evolved Universal Terrestrial Radio Access (E-UTRA); Physical layer procedures (Release 10)," Technical Specification, 3GPP TS 36.213 V10.2.0, Jun. 2011, 120 pages.
"3rd Generation Partnership Project; Technical Specification Group Radio Access Network; Evolved Universal Terrestrial Radio Access (E-UTRA); Physical layer for relaying operation (Release 10)," Technical Specification, GPP TS 36.216 V10.3.0, Jun. 2011, 16 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," Technical Specification, 3GPP TS 36.300 V10.4.0, Jun. 2011, 194 pages.
3GPP TR 25.913 V8.0.0, "3rd Generation Partnership Project; Technical Specification Group Radio Access Network; Requirements for Evolved UTRA (E-UTRA) and Evolved UTRAN (E-UTRAN) (Release 8)," Technical Report, Dec. 2008, 18 pages.
3GPP TS 36.300 V10.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," Technical Specification, Dec. 2010, 200 pages.
3GPP TS 36.211 V8.90, "3rd Generation Partnership Project; Technical Specification Group Radio Access Network; Evolved Universal Terrestrial Radio Access (E-UTRA); Physical Channels and Modulation (Release 8)," Technical Specification, Dec. 2009, 83 pages.
3GPP TS 36.212 V10.0.0, "3rd Generation Partnership Project; Technical Specification Group Radio Access Network; Evolved Universal Terrestrial Radio Access (E-UTRA); Multiplexing and channel coding (Release 10)," Technical Specification, Dec. 2010, 72 pages.
3GPP TS 36.213 V8.8.0, "3rd Generation Partnership Project; Technical Specification Group Radio Access Network; Evolved Universal Terrestrial Radio Access (E-UTRA); Physical layer procedures (Release 8)," Technical Specification, Sep. 2009, 77 pages.
3GPP TS 36.213 V10.0.0, "3rd Generation Partnership Project; Technical Specification Group Radio Access Network; Evolved Universal Terrestrial Radio Access (E-UTRA); Physical layer procedures (Release 10)," Technical Specification, Dec. 2010, 98 pages.
3GPP TS 36.331 V9.5.0, "3rd Generation Partnership Project; Technical Specification Group Radio Access Network; Evolved Universal Terrestrial Radio Access (E-UTRA); Radio Resource Control (RRC); Protocol specification (Release 9)," Technical Specification, Dec. 2010, 252 pages.
3GPP TS 36.331 V10.0.0, "3rd Generation Partnership Project; Technical Specification Group Radio Access Network; Evolved Universal Terrestrial Radio Access (E-UTRA); Radio Resource Control (RRC); Protocol specification (Release 10)," Technical Specification, Dec. 2010, 187 pages.
Alcatel-Lucent, CHTTL, "System Design Frameworks to Support Type II Relay Operation in LTE-A," R1-092321, Agenda Item: 15.3, 3GPP TSG RAN WG1 #57bis, Los Angeles, CA, Jun. 29-Jul. 3, 2009, 11 pages.
Cover et al., "Capacity Theorems for the Relay Channel," IEEE Transactions on Information Theory IT-25(5):572-584, 1979.
Dahlman et al., "4G LTE/LTE-Advanced for Mobile Broadband," Academic Press, Oxford, 2011, pp. 194-203. (9 pages).
Damnjanovic et al., "A Survey on 3GPP Heterogeneous Networks," IEEE Wireless Communications, Jun. 2011, pp. 10-21. (12 pages).
Einhaus et al., "Performance Study of an Enhanced Downlink Control Channel Design for LTE," IEEE, 2012, 5 pages.
Ericsson, "A discussion on some technology components for LTE-Advanced," R1-082024, Agenda Item: 6.2, TSG-RAN WG1 #53, Kansas City, MO, USA, May 5-9, 2008, 11 pages.

(56) References Cited

OTHER PUBLICATIONS

Extended European Search Report dated Aug. 21, 2012, for corresponding EP Application No. 12001805.6, 11 pages.
Hosein, "Resource Allocation for the LTE Physical Downlink Control Channel," IEEE, 2009, 5 pages.
Hoymann et al., "Relaying Operation in 3GPP LTE: Challenges and Solutions," IEEE Communications Magazine, Feb. 2012, pp. 156-162. (7 pages).
International Search Report dated Feb. 26, 2013, for corresponding International Application No. PCT/EP2013/051213, 3 pages.
Kramer et al., "On the White Gaussian Multiple-Access Relay Channel," ISIT 2000, Sorrento, Italy, Jun. 25-30, 2000, pp. 40. (1 page).
Kramer et al., "Cooperative Strategies and Capacity Theorems for Relay Networks," IEEE Transactions on Information Theory 51(9):3037-3063, 2005.
Kramer et al., "Cooperative Communications," Foundations and Trends in Networking 1(3-4):271-425, 2006.
Kusume et al., "System Level Performance of Downlink MU-MIMO Transmission for 3GPP LTE-Advanced," IEEE, 2010, 5 pages.
Li et al., "Multi-User Resource Allocation for Downlink Control Channel in LTE Systems," IEEE 21st International Symposium on Personal Indoor and Mobile Radio Communications, 2010, pp. 1499-1503. (5 pages).
Loa et al., "IMT-Advanced Relay Standards," IEEE Communications Magazine, Aug. 2010, pp. 40-48. (9 pages).
Motorola, "Search Space Definition: Reduced PDCCH Blind Detection for Split PDCCH Search Space," R1-073996, 3GPP TSG RAN1#50bis, Agenda Item: 6.2.3, Shanghai, China, Oct. 8-12, 2007, 4 pages.
Nokia Siemens Networks, Nokia, "Comparing In-band vs. Outband Relays in coverage limited scenario," R1-100353, Agenda Item: 8.3, 3GPP TSG RAN WG1 Meeting #59bis, Valencia, ES, Jan. 18-22, 2010, 6 pages.

NTT DOCOMO, "Investigation on Performance Improvement by CRE," R1-112429, Agenda Item: 6.3.1, 3GPP TSG RAN WG1 Meeting #66, Athens, Greece, Aug. 22-26, 2011, 6 pages.
Panasonic, "Discussion on the various types of Relays," R1-082397, Agenda Item: 12 Study Item on LTE-Advanced, 3GPP TSG RAN WG1 Meeting #54, Warsaw, Poland, Jun. 30-Jul. 4, 2008, 6 pages.
Panasonic, "Considerations on PDCCH Enhancements for Release 11," R1-112365, Agenda Item: 6.6.2.2, 3GPP TSG RAN WG1 Meeting #66, Athens, Greece, Aug. 22-26, 2011, 3 pages.
Samsung, "Full duplex configuration of Un and Uu subframes for Type I relay," R1-100139, Agenda Item: 7.5.2, 3GPP TSG RAN WG1 Meeting #59bis, Valencia, Spain, Jan. 18-22, 2010, 3 pages.
Sesia et al., "LTE—The UMTS Long Term Evolution—From Theory to Practice," Second Edition, John Wiley & Sons Ltd., West Sussex, 2011, 794 pages.
Sesia et al., "LTE—The UMTS Long Term Evolution—From Theory to Practice," Second Edition, John Wiley & Sons Ltd., West Sussex, 2011, Chapter 30., "Relaying," Hardouin et al., pp. 673-700. (28 pages).
Walke et al., "Layer-2 Relays for IMT-Advanced Cellular Networks," Chapter 8, in "Radio Technologies and Concepts for IMT-Advanced," ed. Dottling et al., 2009, pp. 277-323. (47 pages).
Wengerter et al., "Fairness and Throughput Analysis for Generalized Proportional Fair Frequency Scheduling in Ofdma," IEEE, 2005, 5 pages.
Yuan et al., "Carrier Aggregation for LTE-Advanced Mobile Communication Systems," IEEE Communications Magazine, 2010, pp. 88-93. (6 pages).
Notice of Preliminary Rejection, dated Apr. 9, 2019, corresponding to Korean Patent Application No. 10-2013-7030310, 13 pages.
Panasonic, "R-PDCCH search space design," R1-105498, 3GPP TSG RAN WG1 Meeting #62bis, Agenda Item 6.1.1 R-PDCCH search space design, Xi'an, China, Oct. 11-15, 2010, 5 pages.

* cited by examiner

SEARCH SPACE FOR EPDCCH CONTROL INFORMATION IN AN OFDM-BASED MOBILE COMMUNICATION SYSTEM

The present invention relates to methods and apparatuses for configuration of search space and to search space channel structure for signaling of the control information.

Third generation (3G) mobile systems, such as, for instance, universal mobile telecommunication systems (UMTS) standardized within the third generation partnership project (3GPP) have been based on wideband code division multiple access (WCDMA) radio access technology. Today, 3G systems are being deployed on a broad scale all around the world. After enhancing this technology by introducing high-speed downlink packet access (HSDPA) and an enhanced uplink, also referred to as high-speed uplink packet access (HSUPA), the next major step in evolution of the UMTS standard has brought the combination of orthogonal frequency division multiplexing (OFDM) for the downlink and single carrier frequency division multiplexing access (SC-FDMA) for the uplink. This system has been named long term evolution (LTE) since it has been intended to cope with future technology evolutions.

The LTE system represents efficient packet based radio access and radio access networks that provide full IP-based functionalities with low latency and low cost. The detailed system requirements are given in 3GPP TR 25.913, "Requirements for evolved UTRA (E-UTRA) and evolved UTRAN (E-UTRAN)," v8.0.0, December 2008, (available at http://www.3gpp.org/ and incorporated herein by reference). The Downlink will support data modulation schemes QPSK, 16QAM, and 64QAM and the Uplink will support BPSK, QPSK, 8PSK and 16QAM.

LTE's network access is to be extremely flexible, using a number of defined channel bandwidths between 1.25 and 20 MHz, contrasted with UMTS terrestrial radio access (UTRA) fixed 5 MHz channels. Spectral efficiency is increased by up to four-fold compared with UTRA, and improvements in architecture and signaling reduce round-trip latency. Multiple Input/Multiple Output (MIMO) antenna technology should enable 10 times as many users per cell as 3GPP's original WCDMA radio access technology. To suit as many frequency band allocation arrangements as possible, both paired (frequency division duplex FDD) and unpaired (time division duplex TDD) band operation is supported. LTE can co-exist with earlier 3GPP radio technologies, even in adjacent channels, and calls can be handed over to and from all 3GPP's previous radio access technologies.

FIG. 1 illustrates structure of a component carrier in LTE Release 8. The downlink component carrier of the 3GPP LTE Release 8 is sub-divided in the time-frequency domain in so-called sub-frames each of which is divided into two downlink slots 120 corresponding to a time period $T_{slot}$. The first downlink slot comprises a control channel region within the first OFDM symbol(s). Each sub-frame consists of a given number of OFDM symbols in the time domain, each OFDM symbol spanning over the entire bandwidth of the component carrier.

The smallest unit of resources that can be assigned by a scheduler is a resource block 130 also called physical resource block (PRB). A PRB 130 is defined as $N_{symb}^{DL}$ consecutive OFDM symbols in the time domain and $N_{sc}^{RB}$ consecutive sub-carriers in the frequency domain. In practice, the downlink resources are assigned in resource block pairs. A resource block pair consists of two resource blocks. It spans $N_{sc}^{RB}$ consecutive sub-carriers in the frequency domain and the entire $2 \cdot N_{symb}^{DL}$ modulation symbols of the sub-frame in the time domain. $N_{symb}^{DL}$ may be either 6 or 7 resulting in either 12 or 14 OFDM symbols in total. Consequently, a physical resource block 130 consists of $N_{symb}^{DL} \times N_{sc}^{RB}$ resource elements 140 corresponding to one slot in the time domain and 180 kHz in the frequency domain (further details on the downlink resource grid can be found, for example, in 3GPP TS 36.211, "Evolved universal terrestrial radio access (E-UTRA); physical channels and modulations (Release 8)", version 8.9.0, December 2009, Section 6.2, available at http://www.3gpp.org. which is incorporated herein by reference).

The number of physical resource blocks $N_{RB}^{DL}$ in downlink depends on the downlink transmission bandwidth configured in the cell and is at present defined in LTE as being from the interval of 6 to 110 PRBs.

The data are mapped onto physical resource blocks by means of pairs of virtual resource blocks. A pair of virtual resource blocks is mapped onto a pair of physical resource blocks. The following two types of virtual resource blocks are defined according to their mapping on the physical resource blocks in LTE downlink:

Localized Virtual Resource Block (LVRB)
Distributed Virtual Resource Block (DVRB)

In the localized transmission mode using the localized VRBs, the eNB has full control which and how many resource blocks are used, and should use this control usually to pick resource blocks that result in a large spectral efficiency. In most mobile communication systems, this results in adjacent physical resource blocks or multiple clusters of adjacent physical resource blocks for the transmission to a single user equipment, because the radio channel is coherent in the frequency domain, implying that if one physical resource block offers a large spectral efficiency, then it is very likely that an adjacent physical resource block offers a similarly large spectral efficiency. In the distributed transmission mode using the distributed VRBs, the physical resource blocks carrying data for the same UE are distributed across the frequency band in order to hit at least some physical resource blocks that offer a sufficiently large spectral efficiency, thereby obtaining frequency diversity.

In 3GPP LTE Release 8 there is only one component carrier in uplink and downlink. Downlink control signaling is basically carried by the following three physical channels:

Physical control format indicator channel (PCFICH) for indicating the number of OFDM symbols used for control signaling in a sub-frame (i.e. the size of the control channel region);

Physical hybrid ARQ indicator channel (PHICH) for carrying the downlink ACK/NACK associated with uplink data transmission; and Physical downlink control channel (PDCCH) for carrying downlink scheduling assignments and uplink scheduling assignments.

The PCFICH is sent from a known position within the control signaling region of a downlink sub-frame using a known pre-defined modulation and coding scheme. The user equipment decodes the PCFICH in order to obtain information about a size of the control signaling region in a sub-frame, for instance, the number of OFDM symbols. If the user equipment (UE) is unable to decode the PCFICH or if it obtains an erroneous PCFICH value, it will not be able to correctly decode the L1/L2 control signaling (PDCCH) comprised in the control signaling region, which may result in losing all resource assignments contained therein.

The PDCCH carries control information, such as, for instance, scheduling grants for allocating resources for downlink or uplink data transmission. A physical control channel is transmitted on an aggregation of one or several consecutive control channel elements (CCEs). Each CCE corresponds to a set of resource elements grouped to so-called resource element groups (REG). A control channel element typically corresponds to 9 resource element groups. A scheduling grant on PDCCH is defined based on control channel elements (CCE). Resource element groups are used for defining the mapping of control channels to resource elements. Each REG consists of four consecutive resource elements excluding reference signals within the same OFDM symbol. REGs exist in the first one to four OFDM symbols within one sub-frame. The PDCCH for the user equipment is transmitted on the first of either one, two or three OFDM symbols according to PCFICH within a sub-frame.

Another logical unit used in mapping of data onto physical resources in 3GPP LTE Release 8 (and later releases) is a resource block group (RBG). A resource block group is a set of consecutive (in frequency) physical resource blocks. The concept of RBG provides a possibility of addressing particular RBGs for the purpose of indicating a position of resources allocated for a receiving node (e.g. UE), in order to minimize the overhead for such an indication, thereby decreasing the control overhead to data ratio for a transmission. The size of RBG is currently specified to be 1, 2, 3, or 4, depending on the system bandwidth, in particular, on $N_{RB}^{DL}$. Further details of RBG mapping for PDCCH in LTE Release 8 may be found in 3GPP TS 36.213 "Evolved Universal terrestrial Radio Access (E-UTRA); Physical layer procedures", v8.8.0, September 2009, Section 7.1.6.1, freely available http://www.3gpp org/ and incorporated herein by reference.

Physical downlink shared channel (PDSCH) is used to transport user data. PDSCH is mapped to the remaining OFDM symbols within one sub-frame after PDCCH. The PDSCH resources allocated for one UE are in the units of resource block for each sub-frame.

FIG. 2 shows an exemplary mapping of PDCCH and PDSCH within a sub-frame. The first two OFDM symbols form a control channel region (PDCCH region) and are used for L1/L2 control signaling. The remaining twelve OFDM symbols form data channel region (PDSCH region) and are used for data. Within a resource block pairs of all sub-frames, cell-specific reference signals, so-called common reference signals (CRS), are transmitted on one or several antenna ports 0 to 3. In the example of FIG. 2, the CRS are transmitted from two antenna ports: R0 and R1. Moreover, the sub-frame also includes UE-specific reference signals, so-called demodulation reference signals (DM-RS) used by the user equipment for demodulating the PDSCH. The DM-RS are only transmitted within the resource blocks in which the PDSCH is allocated for a certain user equipment. In order to support multiple input/multiple output (MIMO) with DM-RS, four DM-RS layers are defined meaning that at most, MIMO of four layers is supported. In this example, in FIG. 2, DM-RS layer 1, 2, 3 and 4 are corresponding to MIMO layer 1, 2, 3 and 4.

One of the key features of LTE is the possibility to transmit multicast or broadcast data from multiple cells over a synchronized single frequency network which is known as multimedia broadcast single frequency network (MBSFN) operation. In MBSFN operation, UE receives and combines synchronized signals from multiple cells. To facilitate this, UE needs to perform a separate channel estimation based on an MBSFN reference signal. In order to avoid mixing the MBSFN reference signal and normal reference signal in the same sub-frame, certain sub-frames known as MB SFN sub-frames are reserved from MBSFN transmission.

The structure of an MBSFN sub-frame is shown in FIG. 3 up to two of the first OFDM symbols are reserved for non-MB SFN transmission and the remaining OFDM symbols are used for MBSFN transmission. In the first up to two OFDM symbols, PDCCH for uplink resource assignments and PHICH can be transmitted and the cell-specific reference signal is the same as non-MBSFN transmission sub-frames. The particular pattern of MBSFN sub-frames in one cell is broadcasted in the system information of the cell. UEs not capable of receiving MBSFN will decode the first up to two OFDM symbols and ignore the remaining OFDM symbols. MBSFN sub-frame configuration supports both 10 ms and 40 ms periodicity. However, sub-frames with number 0, 4, 5 and 9 cannot be configured as MBSFN sub-frames. FIG. 3 illustrates the format of an MBSFN sub-frame. The PDCCH information sent on the L1/L2 control signaling may be separated into the shared control information and dedicated control information.

The frequency spectrum for IMT-advanced was decided at the World Radio Communication Conference (WRC-07) in November 2008. However, the actual available frequency bandwidth may differ for each region or country. The enhancement of LTE standardized by 3GPP is called LTE-advanced (LTE-A) and has been approved as the subject matter of Release 10. LTE-A Release 10 employs carrier aggregation according to which two or more component carriers as defined for LTE Release 8 are aggregated in order to support wider transmission bandwidth, for instance, transmission bandwidth up to 100 MHz. More details on carrier aggregation can be found in 3GPP TS 36.300 "Evolved Universal terrestrial Radio Access (E-UTRA) and Universal terrestrial Radio Access Network (E-UTRAN); Overall description", v10.2.0, December 2010, Section 5.5 (Physical layer), Section 6.4 (Layer 2) and Section 7.5 (RRC), freely available at http://www.3gpp.org/ and incorporated herein by reference. It is commonly assumed that the single component carrier does not exceed a bandwidth of 20 MHz. A terminal may simultaneously receive and/or transmit on one or multiple component carriers depending on its capabilities. A UE may be configured to aggregate a different number of component carriers (CC) in the uplink and in the downlink. The number of downlink CCs which can be configured depends on the downlink aggregation capability of the UE. The number of uplink CCs which can be configured depends on the uplink aggregation capability of the UE. However, it is not possible to configure a UE with more uplink CCs than downlink CCs.

The term "component carrier" is sometimes replaces with the term "cell" since, similar to a concept of a cell known from earlier releases of LTE and UMTS, a component carrier defines resources for transmission/reception of data and may be added/reconfigures/removed from the resources utilized by the wireless nodes (e.g. UE, RN). In particular, a cell is a combination of downlink and optionally uplink resources, i.e. downlink and optional uplink component carrier. In Rel-8/9, there are one carrier frequency of downlink resources and one carrier frequency of uplink resources. The carrier frequency of downlink resources is detected by UE through cell selection procedure. The carrier frequency of uplink resources is informed to UE through System Information Block 2. When carrier aggregation is configured, there are more than one carrier frequency of downlink resources and possibly more than one carrier frequency of uplink resources. Therefore, there would be more than one combination of downlink and optionally uplink resources, i.e. more than one serving cell. The primary serving cell is called Primary Cell (PCell). Other serving cells are called Secondary Cells (SCells).

When carrier aggregation is configured, a UE has only one Radio Resource Control (RRC) connection with the network. Primary Cell (PCell) provides the non-access stratum (NAS) mobility information and security input at RRC connection reestablishment or handover. Depending on UE capabilities, Secondary Cells (SCells) can be configured to form together with the PCell a set of serving cells. RRC connection is the connection between RRC layer on UE side and RRC layer on network side. Establishment, maintenance and release of an RRC connection between the UE and E-UTRAN include: allocation of temporary identifiers between UE and E-UTRAN; configuration of signaling radio bearer(s) for RRC connection, i.e, Low priority SRB and high priority SRB. More details on RRC can be found in 3GPP TS 36.331 "Evolved Universal terrestrial Radio Access (E-UTRA); Radio Resource Control (RRC); Protocol specification", v10.0.0, December 2010, freely available at http://www.3gpp.org/ and incorporated herein by reference.

In the downlink, the carrier corresponding to PCell is called Downlink Primary Component Carrier (DL PCC) whereas in the uplink, the carrier corresponding to PCell is called Uplink Primary Component Carrier (UL PCC). The linking between DL PCC and UL PCC is indicated in the system information (System Information Block 2) from the PCell. System information is common control information broadcast by each cell, including, for instance, information about the cell to the terminals. With regard to the system information reception for the PCell, the procedure of LTE in Rel-8/9 applies. The details on system information reception procedure for Rel-8/9 can be found in 3GPP TS 36.331 "Evolved Universal terrestrial Radio Access (E-UTRA); Radio Resource Control (RRC); Protocol specification", v9.5.0, December 2010, Section 5.2, freely available at http://www.3gpp.org/ and incorporated herein by reference. In the downlink, the carrier corresponding to an SCell is a Downlink Secondary Component Carrier (DL SCC) while in the uplink it is an Uplink Secondary Component Carrier (UL SCC). The linking between DL SCC and UL SCC is indicated in the system information (System Information Block 2) of the SCell. All required system information of the SCell is transmitted to UE through dedicated RRC signaling when adding an SCell. Hence, there is no need for the UE to acquire system information directly from SCells. The system information of an SCell remains valid as long as the SCell is configured. Changes in system information of an SCell are handled through the removal and addition of the SCell. Removal and/or addition of an SCell can be performed using an RRC procedure.

Both downlink grant and uplink grant are received on DL CC. Therefore, in order to know the uplink grant received on one DL CC corresponds to the uplink transmission of which UL CC, the linking between DL CC and UL CC would be necessary.

A linking between UL CC and DL CC allows identifying the serving cell for which the grant applies:
  downlink assignment received in PCell corresponds to downlink transmission in the PCell,
  uplink grant received in PCell corresponds to uplink transmission in the PCell,
  downlink assignment received in $SCell_N$ corresponds to downlink transmission in the $SCell_N$,
  uplink grant received in $SCell_N$ corresponds to uplink transmission in the $SCell_N$. If $SCell_N$ is not configured for uplink usage by the UE, the grant is ignored by the UE.

3GPP TS 36.212 v10.0.0, also describes in Section 5.3.3.1 the possibility of cross-carrier scheduling, using a Carrier Indication Field (CIF).

UE may be scheduled over multiple serving cells simultaneously. A cross-carrier scheduling with a CIF allows the PDCCH of a serving cell to schedule resources in another serving cell(s), however, with the following restrictions:
  cross-carrier scheduling does not apply to PCell, which means that PCell is always scheduled via its own PDCCH,
  when the PDCCH of a secondary cell (SCell) is configured, cross-carrier scheduling does not apply to this SCell, which means that the SCell is always scheduled via its own PDCCH, and
  when the PDCCH of an SCell is not configured, cross-carrier scheduling applies and such SCell is always scheduled via PDCCH of another serving cell.

Therefore, if there is no CIF, the linking between DL CC and UL CC identifies the UL CC for uplink transmission; if there is CIF, the CIF value identifies the UL CC for uplink transmission.

The set of PDCCH candidates to monitor, where monitoring implies attempting to decode each of the PDCCHs, are defined in terms of search spaces. A UE not configured with a Carrier Indicator Field (CIF) shall monitor one UE-specific search space at each of the aggregation levels 1,2,4,8 on each activated serving cell. A UE configured with a Carrier Indicator Field (CIF) shall monitor one or more UE-specific search spaces at each of the aggregation levels 1,2,4,8 on one or more activated serving cells. If a UE is configured with a CIF, the UE specific search space is determined by the component carrier, which means that the indices of CCEs corresponding to PDCCH candidates of the search space are determined by the Carrier Indicator Field (CIF) value. The carrier indicator field specifies an index of a component carrier.

If a UE is configured to monitor PDCCH candidates in a given serving cell with a given DCI format size with CIF, the UE shall assume that a PDCCH candidate with the given DCI format size may be transmitted in the given serving cell in any UE specific search space corresponding to any of the possible values of CIF for the given DCI format size. It means that if one given DCI format size can have more than one CIF value, UE shall monitor the PDCCH candidates in any UE specific search spaces corresponding to any possible CIF value with that given DCI format.

Further details on configurations of search spaces with and without CIF as defined in LTE-A for PDCCH can be found in 3GPP TS 36.213 "Evolved Universal terrestrial Radio Access (E-UTRA); Physical Layer procedures", v10.0.0, December 2010, Section 9.1.1, freely available at http://www.3gpp.org/ and incorporated herein by reference.

Another key feature of the LTE-A is providing relaying functionality by means of introducing relay nodes to the UTRAN architecture of 3GPP LTE-A. Relaying is considered for LTE-A as a tool for improving the coverage of high data rates, group mobility, temporary network deployment, the cell edge throughput and/or to provide coverage in new areas.

A relay node is wirelessly connected to radio access network via a donor cell. Depending on the relaying strategy, a relay node may be part of the donor cell or, alternatively, may control the cells on its own. In case the relay node is a part of the donor cell, the relay node does not have a cell identity on its own, however, may still have a relay ID. In the case the relay node controls cells on its own, it controls one or several cells and a unique physical layer cell identity is provided in each of the cells controlled by the relay. At least, "type 1" relay nodes will be a part of 3GPP LTE-A. A "type 1" relay node is a relaying node characterized by the following:

The relay node controls cells each of which appears to a user equipment as a separate cell distinct from the donor cell.

The cells should have its own physical cell ID as defined in LTE Release 8 and the relay node shall transmit its own synchronization channels, reference symbols etc.

Regarding the single cell operation, the UE should receive scheduling information and HARQ feedback directly from the relay node and send its controlled information (acknowledgments, channel quality indications, scheduling requests) to the relay node.

The relay node should appear as a 3GPP LTE compliant eNodeB to 3GPP LTE compliant user equipment in order to support the backward compatibility.

The relay node should appear differently to the 3GPP LTE eNodeB in order to allow for further performance enhancements to the 3GPP LTE-A compliant user equipments.

FIG. 4 illustrates an example 3GPP LTE-A network structure using relay nodes. A donor eNodeB (d-eNB) 410 directly serves a user equipment UE1 415 and a relay node (RN) 420 which further serves UE2 425. The link between donor eNodeB 410 and the relay node 420 is typically referred to as relay backhaul uplink/downlink. The link between the relay node 420 and user equipment 425 attached to the relay node (also denoted r-UEs) is called (relay) access link.

The donor eNodeB transmits L1/L2 control and data to the micro-user equipment UE1 415 and also to a relay node 420 which further transmits the L1/L2 control and data to the relay-user equipment UE2 425. The relay node may operate in a so-called time multiplexing mode, in which transmission and reception operation cannot be performed at the same time. In particular, if the link from eNodeB 410 to relay node 420 operates in the same frequency spectrum as the link from relay node 420 to UE2 425, due to the relay transmitter causing interference to its own receiver, simultaneous eNodeB-to-relay node and relay node-to-UE transmissions on the same frequency resources may not be possible unless sufficient isolation of the outgoing and incoming signals is provided. Thus, when relay node 420 transmits to donor eNodeB 410, it cannot, at the same time, receive from UEs 425 attached to the relay node. Similarly, when a relay node 420 receives data from donor eNodeB, it cannot transmit data to UEs 425 attached to the relay node. Thus, there is a sub-frame partitioning between relay backhaul link and relay access link.

Regarding the support of relay nodes, in 3GPP it has currently been agreed that:

Relay backhaul downlink sub-frames during which eNodeB to relay downlink backhaul transmission is configured, are semi-statically assigned.

Relay backhaul uplink sub-frames during which relay-to-eNodeB uplink backhaul transmission is configured are semi-statically assigned or implicitly derived by HARQ timing from relay backhaul downlink sub-frames.

In relay backhaul downlink sub-frames, a relay node will transmit to donor eNodeB and consequently r-UEs are not supposed to expect receiving any data from the relay node. In order to support backward compatibility for UEs that are not aware of their attachment to a relay node (such as Release 8 UEs for which a relay node appears to be a standard eNodeB), the relay node configures backhaul downlink sub-frames as MBSFN sub-frames.

In the following, a network configuration as shown in FIG. 4 is assumed for exemplary purposes. The donor eNodeB transmits L1/L2 control and data to the macro-user equipment (UE1) and 410 also to the relay (relay node) 420, and the relay node 420 transmits L1/L2 control and data to the relay-user equipment (UE2) 425. Further assuming that the relay node operates in a time-duplexing mode, i.e. transmission and reception operation are not performed at the same time. Whenever the relay node is in "transmit" mode, UE2 needs to receive the L1/L2 control channel and physical downlink shared channel (PDSCH), while when the relay node is in "receive" mode, i.e. it is receiving L1/L2 control channel and PDSCH from the Node B, it cannot transmit to UE2 and therefore UE2 cannot receive any information from the relay node in such a sub-frame. In the case that the UE2 is not aware that it is attached to a relay node (for instance, a Release-8 UE), the relay node 420 has to behave as a normal (e-)NodeB. As will be understood by those skilled in the art, in a communication system without relay node any user equipment can always assume that at least the L1/L2 control signal is present in every sub-frame. In order to support such a user equipment in operation beneath a relay node, the relay node should therefore pretend such an expected behavior in all sub-frames.

As shown in FIGS. 2 and 3, each downlink sub-frame consists of two parts, control channel region and data region. FIG. 5 illustrates an example of configuring MBSFN frames on relay access link in situation, in which relay backhaul transmission takes place. Each subframe comprises a control data portion 510, 520 and a data portion 530, 540. The first OFDM symbols 720 in an MBSFN subframe are used by the relay node 420 to transmit control symbols to the r-UEs 425. In the remaining part of the sub-frame, the relay node may receive data 540 from the donor eNodeB 410. Thus, there cannot be any transmission from the relay node 420 to the r-UE 425 in the same sub-frame. The r-UE receives the first up to two OFDM control symbols and ignores the remaining part of the sub-frame. Non-MBSFN sub-frames are transmitted from the relay node 420 to the r-UE 525 and the control symbols 510 as well as the data symbols 530 are processed by the r-UE 425. An MBSFN sub-frame can be configured for every 10 ms on every 40 ms. Thus, the relay backhaul downlink sub-frames also support both 10 ms and 40 ms configurations. Similarly to the MBSFN sub-frame configuration, the relay backhaul downlink sub-frames cannot be configured at sub-frames with #0, #4, #5 and #9. Those subframes that are not allowed to be configured as backhaul DL subframes are called "illegal DL subframes". Thus, relay DL backhaul subframes can be normal or MBSFN subframe on d-eNB side. Currently it is agreed that relay backhaul DL subframes, during which eNB 410 to relay node 420 downlink backhaul transmission may occur, are semi-statically assigned. Relay backhaul UL subframes, during which relay node 420 to eNB 410 uplink backhaul transmission may occur, are semi-statically assigned or implicitly derived by HARQ timing from relay backhaul DL subframes.

Since MBSFN sub-frames are configured at relay nodes as downlink backhaul downlink sub-frames, the relay node cannot receive PDCCH from the donor eNodeB. Therefore, a new physical control channel (R-PDCCH) is used to dynamically or "semi-persistently" assign resources within the semi-statically assigned sub-frames for the downlink and uplink backhaul data. The downlink backhaul data is transmitted on a new physical data channel (R-PDSCH) and the uplink backhaul data is transmitted on a new physical data channel (R-PUSCH). The R-PDCCH(s) for the relay node is/are mapped to an R-PDCCH region within the PDSCH region of the sub-frame. The relay node expects to receive R-PDCCH within the region of the sub-frame. In time domain, the R-PDCCH region spans the configured downlink backhaul sub-frames. In frequency domain, the R-PDCCH region exists on certain resource blocks preconfigured for the relay node by higher layer signaling. Regarding the design and use of an R-PDCCH region within a sub-frame, the following characteristics have been agreed in standardization:

- R-PDCCH is assigned PRBs for transmission semi-statically. Moreover, the set of resources to be currently used for R-PDCCH transmission within the above semi-statically assigned PRBs may vary dynamically, between sub-frames.
- The dynamically configurable resources may cover the full set of OFDM symbols available for the backhaul link or may be constrained to their sub-set.
- The resources that are not used for R-PDCCH within the semi-statically assigned PRBs may be used to carry R-PDSCH or PDSCH.
- In case of MB SFN sub-frames, the relay node transmits control signals to the r-UEs. Then, it can become necessary to switch transmitting to receiving mode so that the relay node may receive data transmitted by the donor eNodeB within the same sub-frame. In addition to this gap, the propagation delay for the signal between the donor eNodeB and the relay node has to be taken into account. Thus, the R-PDCCH is first transmitted starting from an OFDM symbol which, within the sub-frame, is late enough in order for a relay node to receive it.
- The mapping of R-PDCCH on the physical resources may be performed either in a frequency distributed manner or in a frequency localized manner.
- The interleaving of R-PDCCH within the limited number of PRBs can achieve diversity gain and, at the same time, limit the number of PRBs wasted.
- In non-MBSFN sub-frames, Release 10 DM-RS is used when DM-RS are configured by ENodeB. Otherwise, Release 8 CRS are used. In MBSFN sub-frames, Release 10 DM-RS are used.
- R-PDCCH can be used for assigning downlink grant or uplink grant for the backhaul link. The boundary of downlink grant search space and uplink grant search space is a slot boundary of the sub-frame. In particular, the downlink grant is only transmitted in the first slot and the uplink grant is only transmitted in the second slot of the sub-frame.
- No interleaving is applied when demodulating with DM-RS. When demodulating with CRS, both REG level interleaving and no interleaving are supported.

Relay backhaul R-PDCCH search space is a region where relay node 420 expects to receive R-PDCCHs. In time domain, it exists on the configured DL backhaul subframes. In frequency domain, it exists on certain resource blocks that are configured for relay node 420 by higher layer signaling. R-PDCCH can be used for assigning DL grant or UL grant for the backhaul link.

According to agreements reached in RAN1 about the characteristics of the relay backhaul R-PDCCH in no cross-interleaving case, a UE-specific search space has following properties:

- Each R-PDCCH candidate contains continuous VRBs,
- The set of VRBs is configured by higher layers using resource allocation types 0, 1, or 2,
- The same set of VRBs is configured for a potential R-PDCCH in the first and in the second slot,
- DL grant is only received in 1st slot and UL grant is only received in 2nd slot, and
- The number of candidates for the respective aggregation level $\{1,2,4,8\}$ is $\{6,6,2,2\}$.

R-PDCCH without cross-interleaving means that, an R-PDCCH can be transmitted on one or several PRBs without being cross-interleaved with other R-PDCCHs in a given PRB. In the frequency domain, the set of VRBs is configured by higher layer using resource allocation types 0, 1, or 2 according to Section 7.1.6 of 3GPP TS 36.213 "Evolved Universal terrestrial Radio Access (E-UTRA); Physical layer procedures", v8.8.0, September 2009, freely available at http://www.3gpp.org/ and incorporated herein by reference. If the set of VRBs is configured by resource allocation type 2 with distributed VRB to PRB mapping, the provisions in Section 6.2.3.2 of 3GPP TS 36.211 for even slot numbers are always applied. The details can be found in 3GPP TS 36.211, "Evolved universal terrestrial radio access (E-UTRA); physical channels and modulation (Release 8)", version 8.9.0, December 2009, Section 6.2, available at http://www.3gpp.org, which is incorporated herein by reference.

The UE usually monitors a set of PDCCH candidates on the serving cell for control information in every non-DRX subframe, where monitoring implies attempting to decode each of the PDCCHs in the set according to all the monitored DCI formats. The set of PDCCH candidates to monitor are defined in terms of search spaces.

UE monitors two types of search space: UE specific search space and common search space. Both UE specific search space and common search space have different aggregation levels.

In UE specific search space, there are $\{6,6,2,2\}$ number of PDCCH candidates at aggregation level $\{1,2,4,8\}$ and the PDCCH candidates of each aggregation level are consecutive in CCEs. The starting CCE index of the first PDCCH candidate in aggregation level L is decided by $Y_k \times L$. k is the subframe number and $Y_k$ is decided by k and UE ID. Therefore, the positions of CCEs in UE specific search space are decided by UE ID to reduce the overlap of PDCCH UE specific search space from different UEs and are randomized from subframe to subframe to randomized the interference from PDCCH in neighboring cells.

In common search space, there are $\{4,2\}$ number of PDCCH candidates at aggregation level $\{4,8\}$. The first PDCCH candidate in aggregation level L starts from CCE index 0. Therefore, all the UEs monitor the same common search space.

PDCCH for system information is transmitted in common search space, so that all the UEs can receive system information by monitoring common search space.

The same also applies in ePDCCH. in ePDCCH, In particular, it is customary to use antenna ports 7-10 for ePDCCH demodulation. Both localized and distributed transmission of ePDCCH are supported.

A full flexible configuration of the search space and the antenna ports (APs) can be used for ePDCCH. However, such approach results in a large signaling overhead while the benefits are minimal.

In view of the above, the aim of the present invention is to provide an efficient scheme for configuring a search space in which control information can be signaled to a receiver. In particular, it is an object of the invention to provide a configuration of the search space such that flexibility is maintained, while the signaling overhead is minimized.

This is achieved by the teaching of the independent claims.

Advantageous embodiments of the invention are subject to the dependent claims.

In particular, the present invention can relate to a method for receiving control information within a subframe of a multi-carrier communication system supporting carrier aggregation, the method comprising the following steps performed at a receiving node: performing a blind detection for the control information within a search space by means of a first search pattern, wherein the first search pattern is one of a plurality of search patterns, each of the plurality of search patterns comprising a plurality of candidates distributed on any of a plurality of aggregation levels, and wherein the plurality of search patterns further comprises a second search pattern whose candidates are non-overlapping the candidates of the first search pattern on the same aggregation levels.

Additionally, the invention can relate to a method for transmitting control information for at least one receiving node within a subframe of a multi-carrier communication system supporting carrier aggregation, the method comprising the following steps performed at the transmitting node: mapping control information for the receiving node onto a search space by means of a first search pattern, wherein the first search pattern is one of a plurality of search patterns, each of the plurality of search patterns comprising a plurality of candidates distributed on any of a plurality of aggregation levels, and transmitting the subframe to the receiving node, wherein the plurality of search patterns further comprises a second search pattern whose candidates are non-overlapping the candidates of the first search pattern on the same aggregation levels.

In further advantageous embodiments, the first search pattern can comprise the same plurality of aggregation levels as the second search pattern and wherein the number of candidates, on any given aggregation level, of the first search pattern can correspond to the number of candidates on the same aggregation level of the second search pattern.

In further advantageous embodiments, the plurality of search patterns can further comprise a third search pattern whose candidates are non-overlapping candidates of the first search pattern on the same aggregation levels.

In further advantageous embodiments, the first search pattern and the third search pattern can have both at least one common aggregation level and wherein the number of candidates of the first search pattern, on the common aggregation level, can correspond to the number of candidates of the third search pattern, on the common aggregation level.

In further advantageous embodiments, the plurality of search patterns can further comprise a fourth search pattern which comprises candidates only within its largest aggregation level.

In further advantageous embodiments, any of the plurality of the search patterns can comprise the candidates which is non-overlapping with each other on the same aggregation level.

In further advantageous embodiments, any of the plurality of the search patterns can comprise the candidates which are non-overlapping with each other on any of the plurality of aggregation levels.

In further advantageous embodiments, at least one of the search patterns can comprise more candidates from smaller aggregations level than from larger aggregation levels and/or at least one of the search patterns comprises more candidates from larger aggregations level than from smaller aggregation levels.

Additionally, the invention can relate to a receiving apparatus for receiving control information within a subframe of a multi-carrier communication system supporting carrier aggregation, the receiving apparatus comprising: a receiving unit for receiving a subframe from a transmitting node; and a detecting unit for performing a blind detection for the control information within a search space by means of a first search pattern, wherein the first search pattern is one of a plurality of search patterns, each of the plurality of search patterns comprising a plurality of candidates distributed on any of a plurality of aggregation levels and wherein the plurality of search patterns further comprises a second search pattern whose candidates are non-overlapping the candidates of the first search pattern on the same aggregation levels.

Additionally, the invention can relate to a transmitting apparatus for transmitting control information for at least one receiving node within a subframe of a multi-carrier communication system supporting carrier aggregation, the transmitting apparatus comprising: a mapping unit for mapping control information for the receiving node onto a search space by means of a first search pattern, wherein the first search pattern is one of a plurality of search patterns, each of the plurality of search patterns comprising a plurality of candidates distributed on any of a plurality of aggregation levels, a transmitting unit for transmitting the subframe to the receiving node, wherein the plurality of search patterns further comprises a second search pattern whose candidates are non-overlapping the candidates of the first search pattern on the same aggregation levels.

Additionally, the invention can relate to a channel structure for carrying control information for at least one receiving node within a subframe of a multi-carrier communication system supporting carrier aggregation, wherein the control information is mapped on a search space by means of a first search pattern, the first search pattern is one of a plurality of search patterns, each of the plurality of search patterns comprising a plurality of candidates distributed on any of a plurality of aggregation levels and wherein the plurality of search patterns further comprises a second search pattern whose candidates are non-overlapping the candidates of the first search pattern on the same aggregation levels.

The above and other objects and features of the present invention will become more apparent from the following description and preferred embodiments given in conjunction with the accompanying drawings in which.

Figure 1:
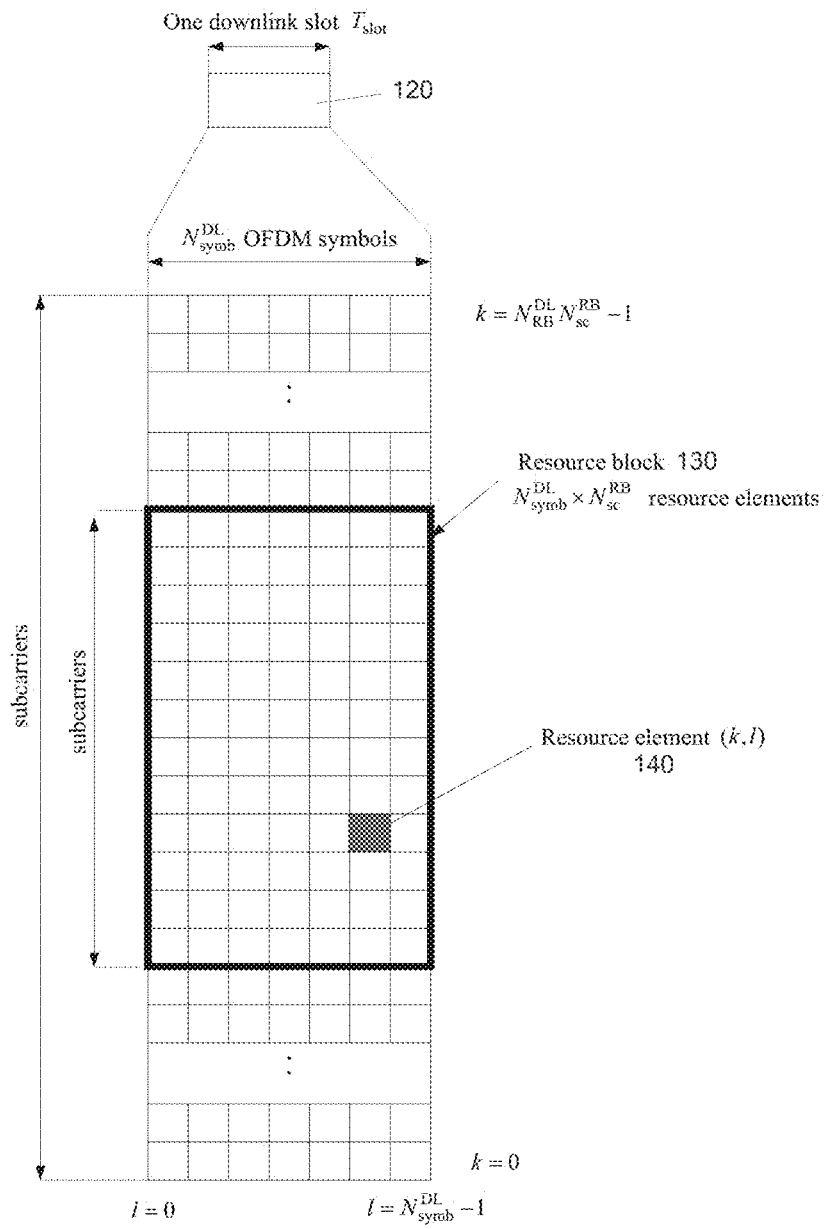
FIG. 1 is a schematic drawing showing an exemplary downlink component carrier of one of two downlink slots of a sub-frame defined for 3GPP LTE release 8.
Figure 2:
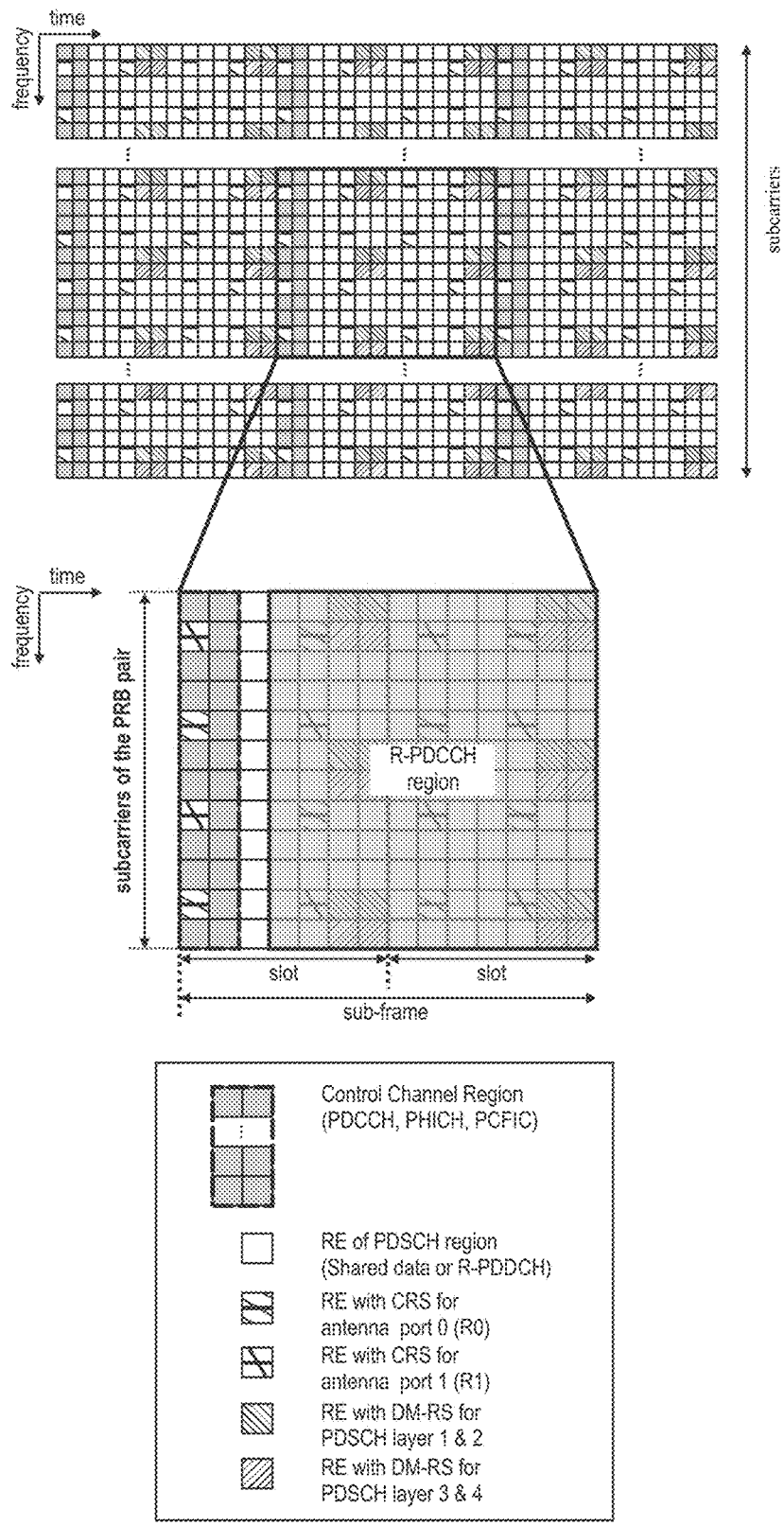
FIG. 2 is a schematic drawing illustrating the structure of a non-MBSFN sub-frames and a physical resource block pair thereof defined for 3GPP LTE release 8 and 3GPP LTE-a release 10.
Figure 3:
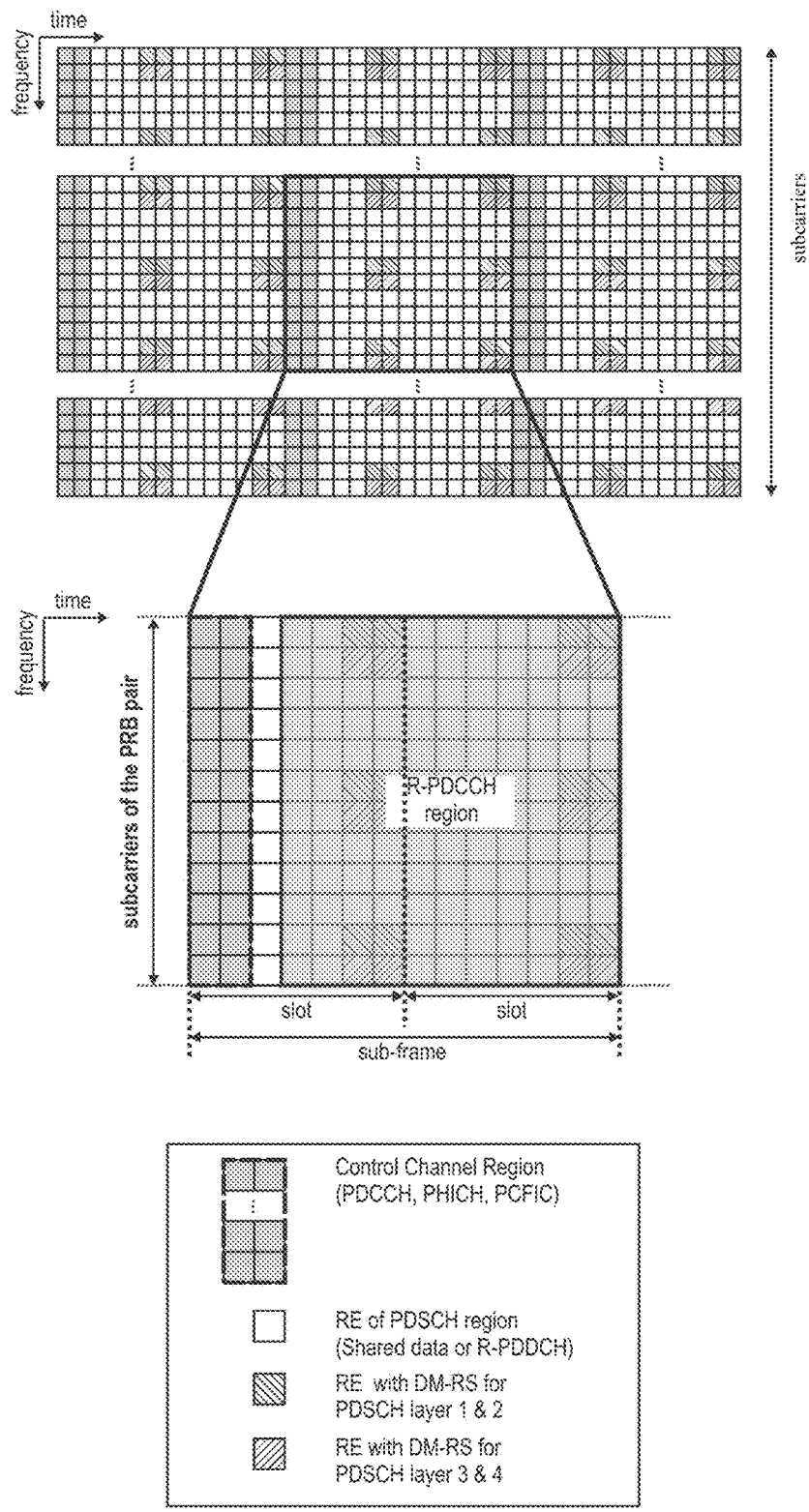
FIG. 3 is a schematic drawing illustrating a structure of MBSFN sub-frames and a physical resource block pair thereof defined for 3GPP LTE Release 8 and 3GPP LTE-A Release 10.
Figure 4:
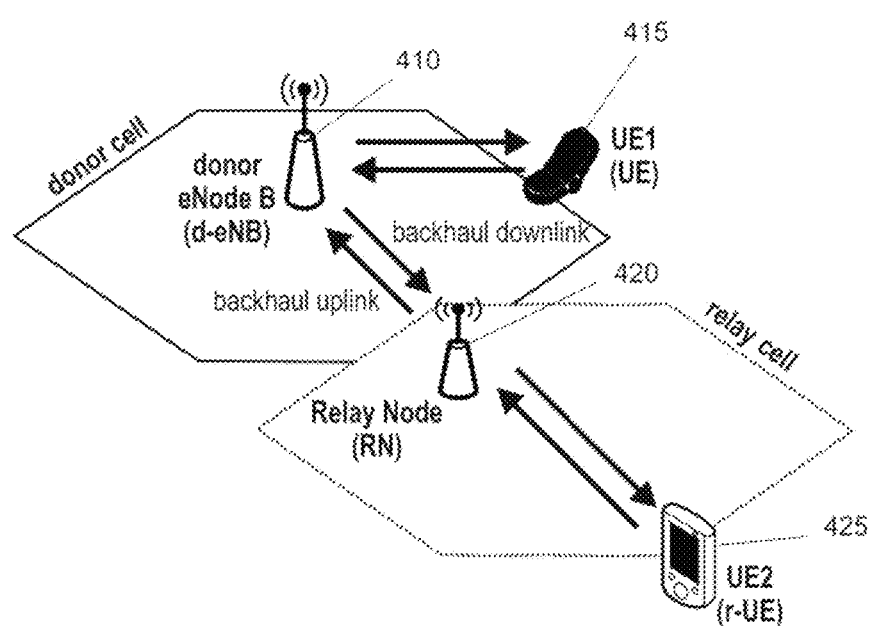
FIG. 4 is a schematic drawing of an exemplary network configuration including a donor eNodeB, a relay node, and two user equipments.
Figure 5:
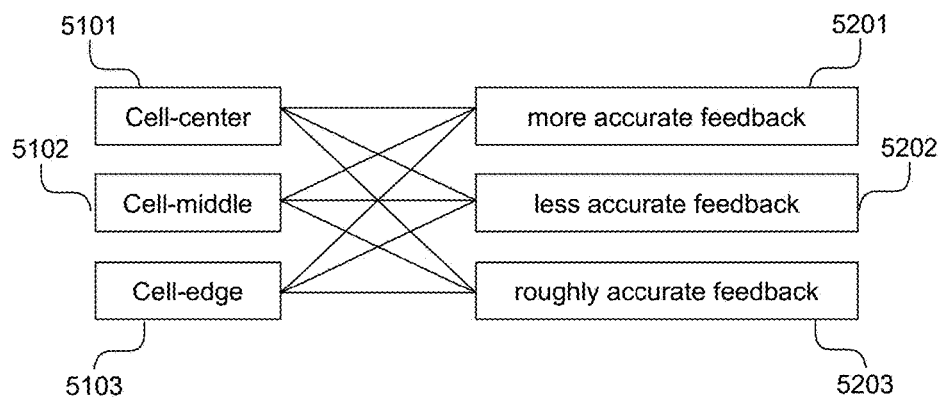
Figure 6:
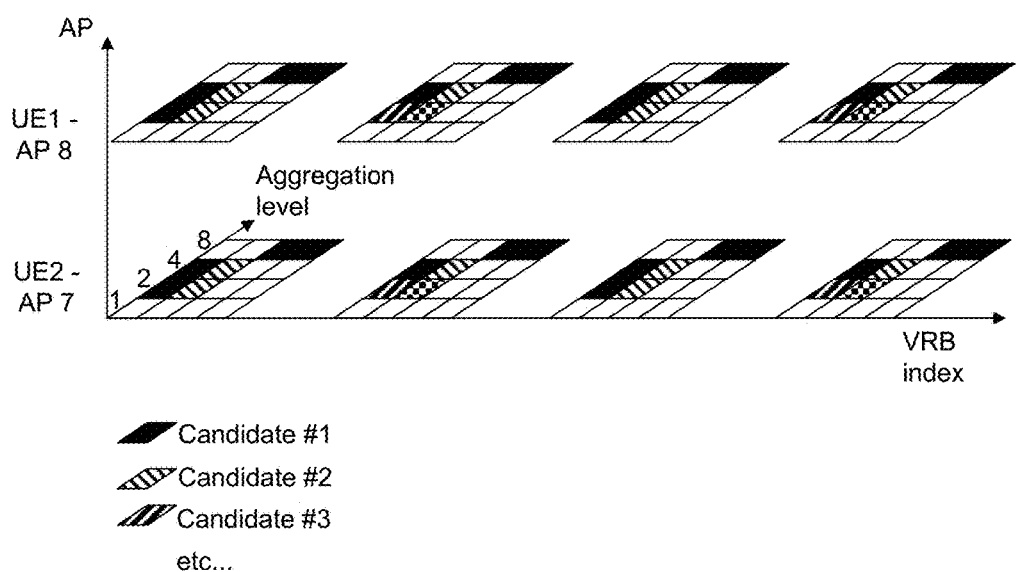
Figure 11:
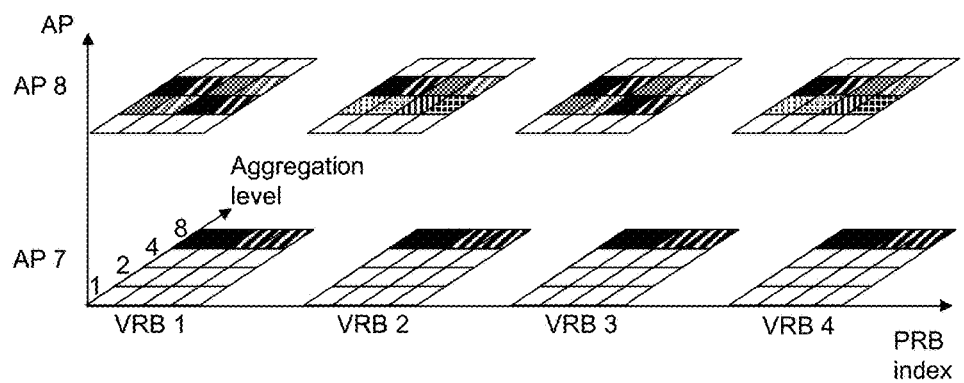
Figure 12:
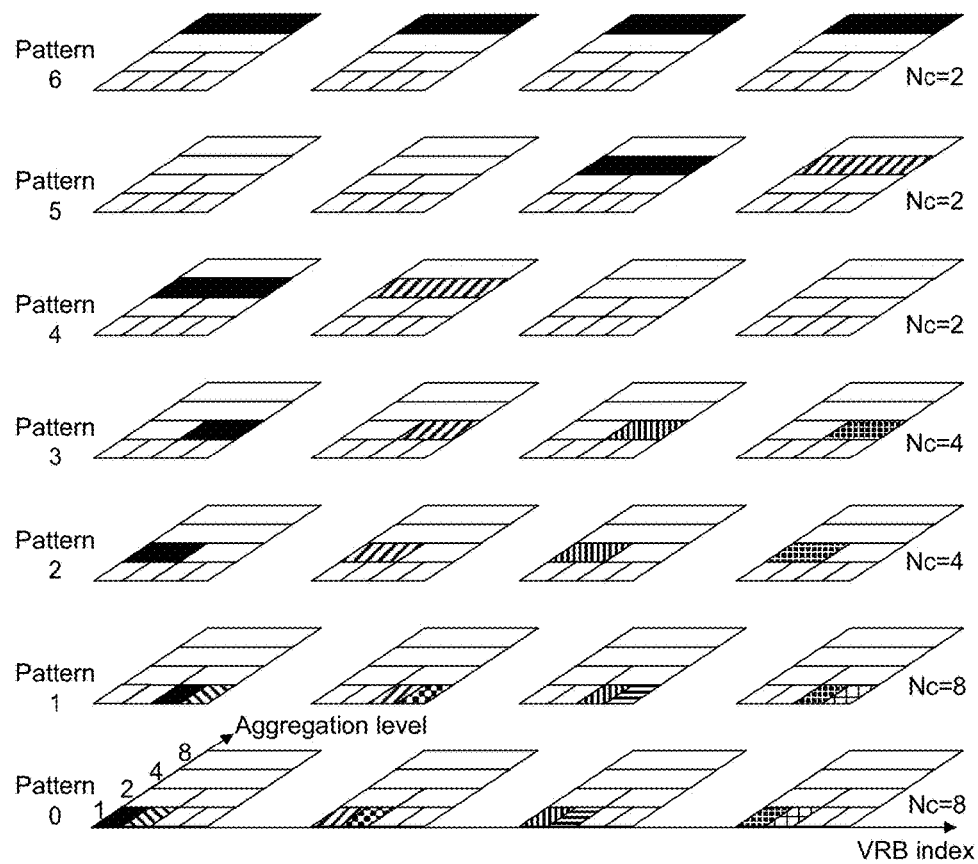
Figure 13:
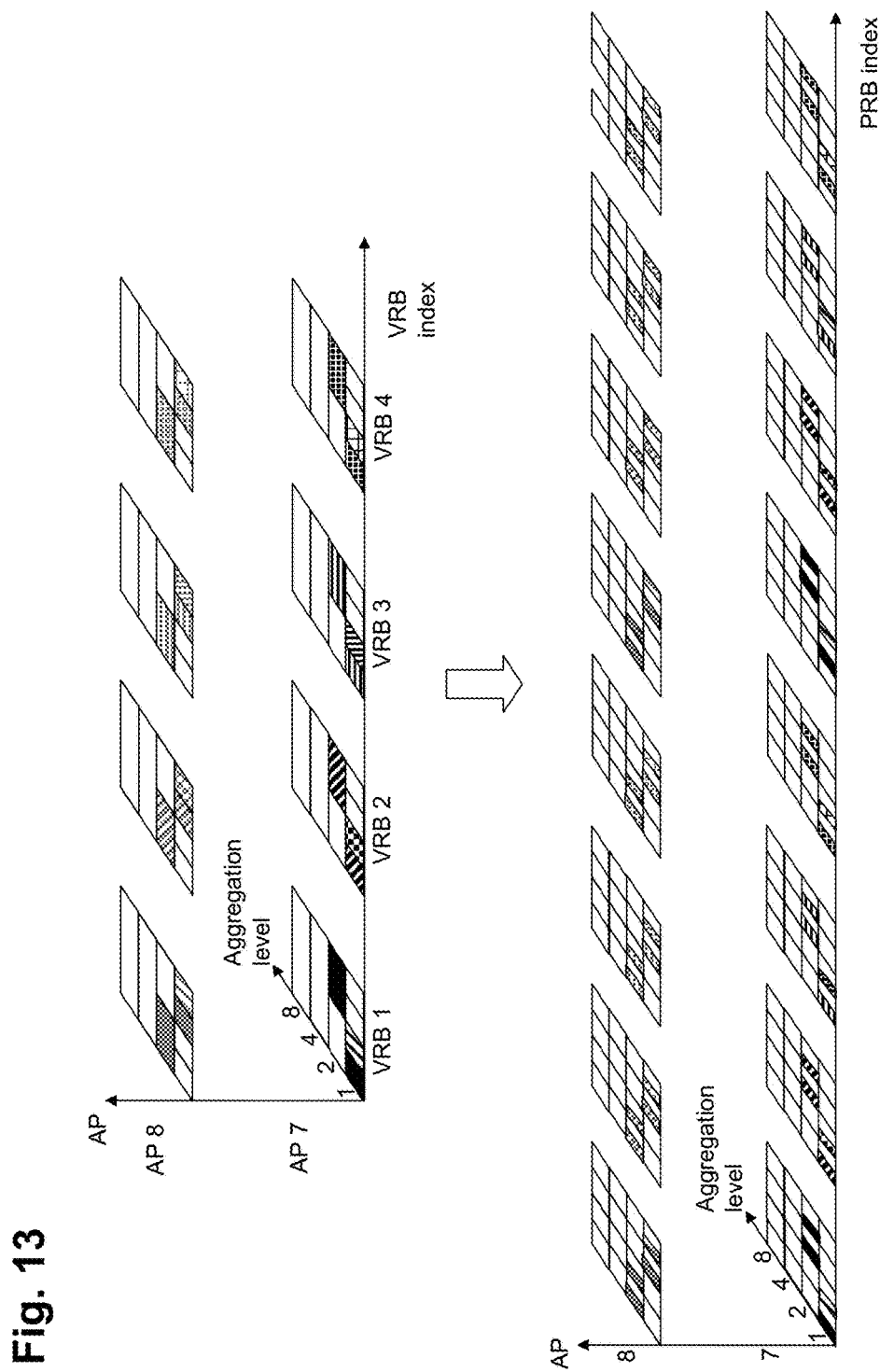
Figure 14:
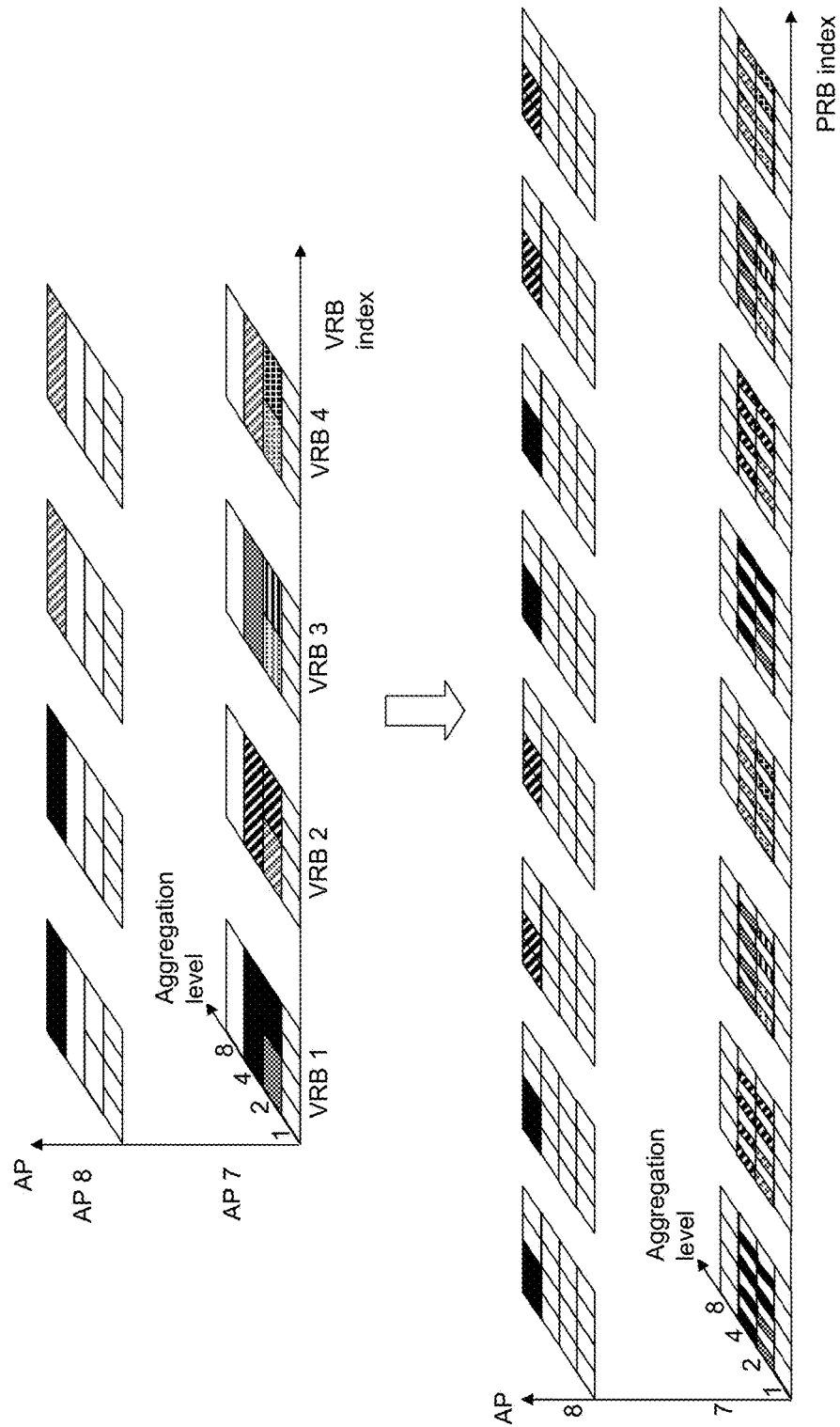
Figure 15:
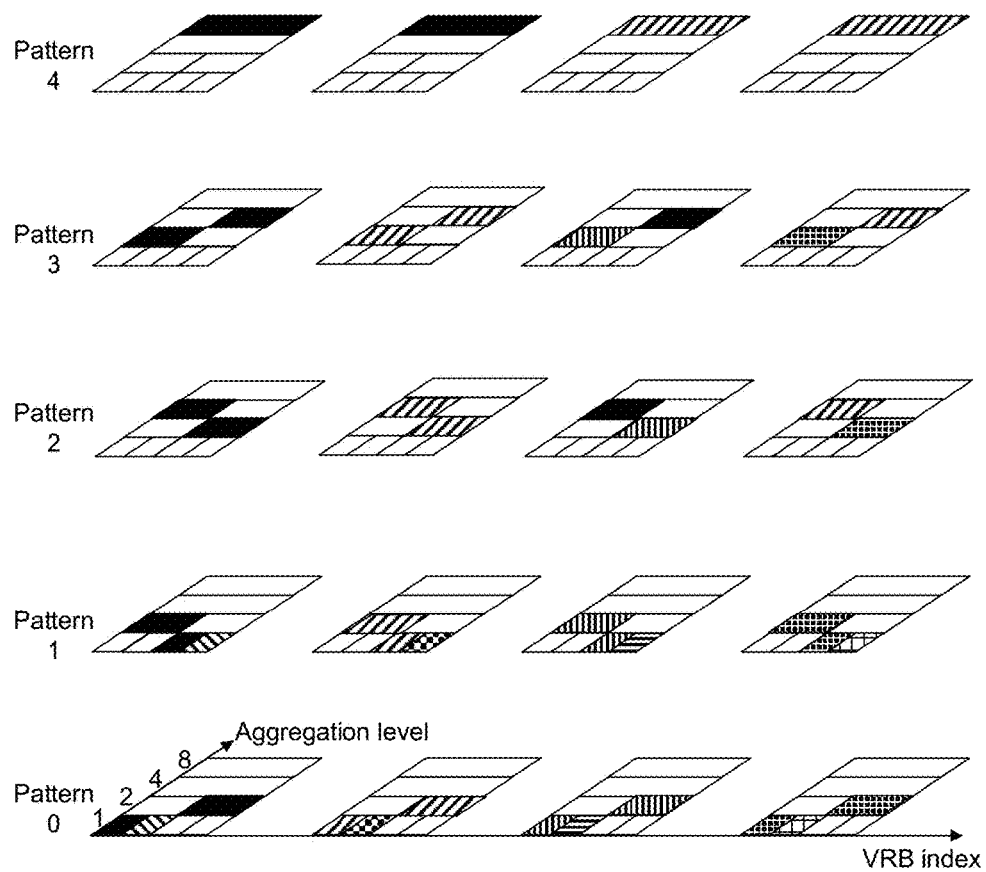

FIG. 5 schematically illustrates possible combination of UE scenarios in accordance with an embodiment of the present invention;

FIG. 6 schematically illustrates search patterns for two UE from the same UE scenario;

FIGS. 7-10 schematically illustrates search patterns in accordance with embodiments of the present invention;

FIG. 11 schematically illustrates a search pattern configuration in accordance with an embodiment of the present invention;

FIG. 12 schematically illustrates a further pattern design in accordance with an embodiment of the present invention;

FIG. 13 schematically illustrates a search pattern configuration in accordance with an embodiment of the present invention;

FIG. 14 schematically illustrates a search pattern configuration in accordance with an embodiment of the present invention; and FIG. 15 schematically illustrates further search patterns in accordance with an embodiment of the present invention.

Thanks to the search space design of the present invention it is possible to avoid the complexity of full flexibility, while providing sufficient choices for different scenarios with limited number of blind decoding trials.

In the following, it is assumed that legacy PDCCH concept is reused, i.e. one ePDCCH is aggregation of {1, 2, 4, 8} eCCEs. It is also assumed that one PRB pair is divided into four eCCEs.

With reference to FIG. 5, a number of different scenarios can be defined in the following manner. According to UE position, there are mainly three scenarios:
1. scenario 5101 comprising cell-center UEs, which can be configured, for instance, with more lower aggregation level candidates;
2. scenario 5103 comprising cell-middle UEs can be configured with some higher aggregation level candidates and some lower aggregation level candidates
3. scenario 5102 comprising cell-edge UEs can be configured with more higher aggregation level candidates; and At the same time, according to UE feedback, there are mainly three scenarios:
i. scenario 5201 comprising UE with more accurate feedback, for instance moving at low speed, preferably using localized candidates;
ii. scenario 5202 comprising UE with less accurate feedback, for instance moving at high speed, preferably using distributed candidates; and
iii. scenario 5203 comprising UE with roughly accurate feedback, preferably using both localized and distributed candidates.

Accordingly, in order to provide a targeted search space for all possible combinations of scenarios 5101-5103 and scenarios 5201-5203, nine possible search patterns have to be defined. However, associating one search pattern to each possible combination may cause blocking. Moreover, such an approach makes it difficult to pack different DCI messages within the same PRB pair.

For instance, with reference to FIG. 6, it can be seen how UE1 and UE2, both being, for instance, cell-middle UEs with less accurate feedback, would have the same search pattern. Accordingly, this makes it difficult to multiplex search spaces from different UE within the same PRB pair. In fact, in such a situation, only spatial multiplexing is possible by, as indicated in the figure, allocating UE1 to AP8 and UE2 to AP7. However, if there are many such kinds of UEs in the system, blocking among search space becomes increasingly critical.

This can be improved by providing a plurality of search patterns having a certain number of candidates for one or more aggregation levels in such a manner to avoid overlapping of search patterns on the same aggregation level for at least two patterns.

Figure 7:
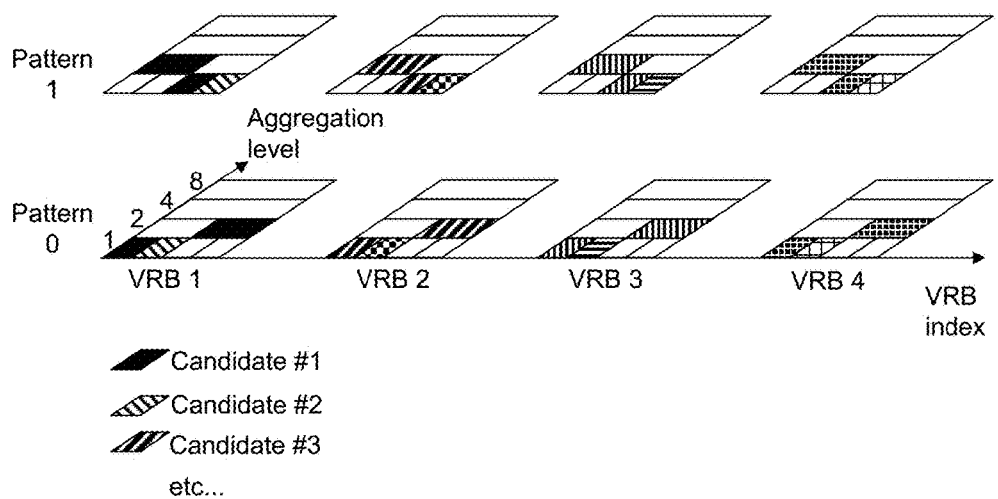

More specifically, FIG. 7 schematically illustrates two patterns, pattern 0 and pattern 1, in accordance with an embodiment of the present invention. In particular, in FIG. 7 the horizontal axis represents the VRB index; the vertical axis represents the AP value while the remaining axis represents the aggregation level. The two patterns 0 and 1 comprise each a plurality of candidates arranged on any of aggregation levels 1, 2, 4 and/or 8. As can be seen, pattern 0 has candidates on aggregation level 1 and aggregation level 2. Similarly, pattern 1 also has candidates on aggregation level 1 and on aggregation level 2. Additionally, the two patterns are designed so that they are non-overlapping. In particular, the mapping of the candidates on aggregation level 1 of pattern 0 does not overlap with candidates on aggregation level 1 of pattern 1. Similarly the mapping of the candidates on aggregation level 2 of pattern 0 does not overlap with candidates on aggregation level 2 of pattern 1.

Alternatively, or in addition, patterns 0 and 1 are designed such that the same aggregation levels and the corresponding number of candidates are present. Further alternatively, or in addition, the mapping of candidates to eCCEs is complementary in both sides for the respective aggregation levels, that is, eCCEs for aggregation level 1 in pattern 0 are not used for aggregation level 1 in pattern 1, and similarly for aggregation level 2.

By defining pattern 0 and pattern 1 in such a manner, packing, i.e. multiplexing, of different DCI messages in the same PRB is achieved since the patterns do not overlap. In particular, DL and UL assignments to the same UE are possible to be transmitted in the same PRB pair. Moreover, since both pattern 0 and pattern 1 define the same number of candidates on the same aggregation levels, they can be applied to different UEs in the same scenario, for instance they could be applied, respectively, to UE1 and UE2 of FIG. 6, without overlapping. This provides more flexibility as the number of possible active UEs can be increased without blocking arising on the channel.

Figure 8:
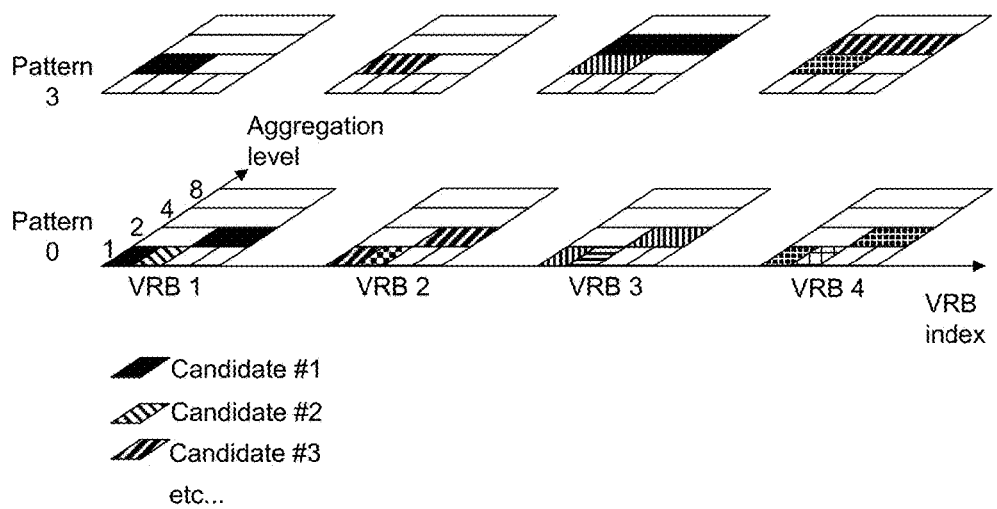

Alternatively, or in addition, FIG. 8 schematically illustrates a further criterion for the definition of a further search pattern, in accordance with an embodiment of the present invention.

In particular, pattern 0 of FIG. 8 corresponds to pattern 0 already defined in FIG. 7. Pattern 3, illustrated in FIG. 8 is constructed so as to provide higher aggregation level candidates, compared to pattern 0, while still providing non-overlapping candidates on aggregation level 2 with respect to pattern 0. This provides the possibility of employing at the same time, both pattern 0 and pattern 3.

Moreover, this allows DCI messages from UEs configured with higher aggregation level candidates to be multiplexed with DCI messages from UEs configured with more lower aggregation level candidates. Even for the same UE, candidates of aggregation levels 1, 2 and 4 can be configured so that US search space does not need to be reconfigured even if UE scenario changed.

Additionally, this design is advantageous since it allows different patterns to have candidates on different aggregation level. For instance, cell-center UEs can be associated with patterns having lower aggregation level candidates, such as pattern 0. At the same time, cell-edge UEs can be associated with patterns having higher aggregation level candidates, such as pattern 3. In this manner, with a limited number of blond decoding trials, different UEs can be configured with different numbers of lower aggregation level candidates and higher aggregation level candidates.

Figure 9:
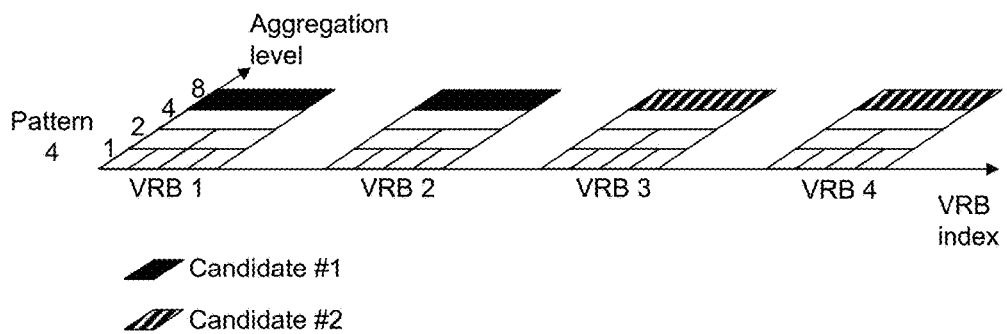

Alternatively, or in addition, FIG. 9 schematically illustrates a further criterion for the definition of a further search pattern, in accordance with an embodiment of the present invention.

In particular, FIG. 9 illustrates a pattern 4 in which only candidates from the largest aggregation level are used. Such an approach provides the advantage that spatial and/or frequency diversity can be obtained, at least for the largest aggregation level, as a fallback mode. Moreover, another benefit is that since aggregation level 8 candidates can easily block candidates of other aggregation levels, pattern 4 can always be configured on another antenna port to avoid blocking of candidates of other aggregation levels.

Although in the above embodiments only five search patterns have been defined, the present invention is not limited thereto and the number of patterns can be increased, by constructing other patterns in accordance with the rules given above, or reduced.

Figure 10:
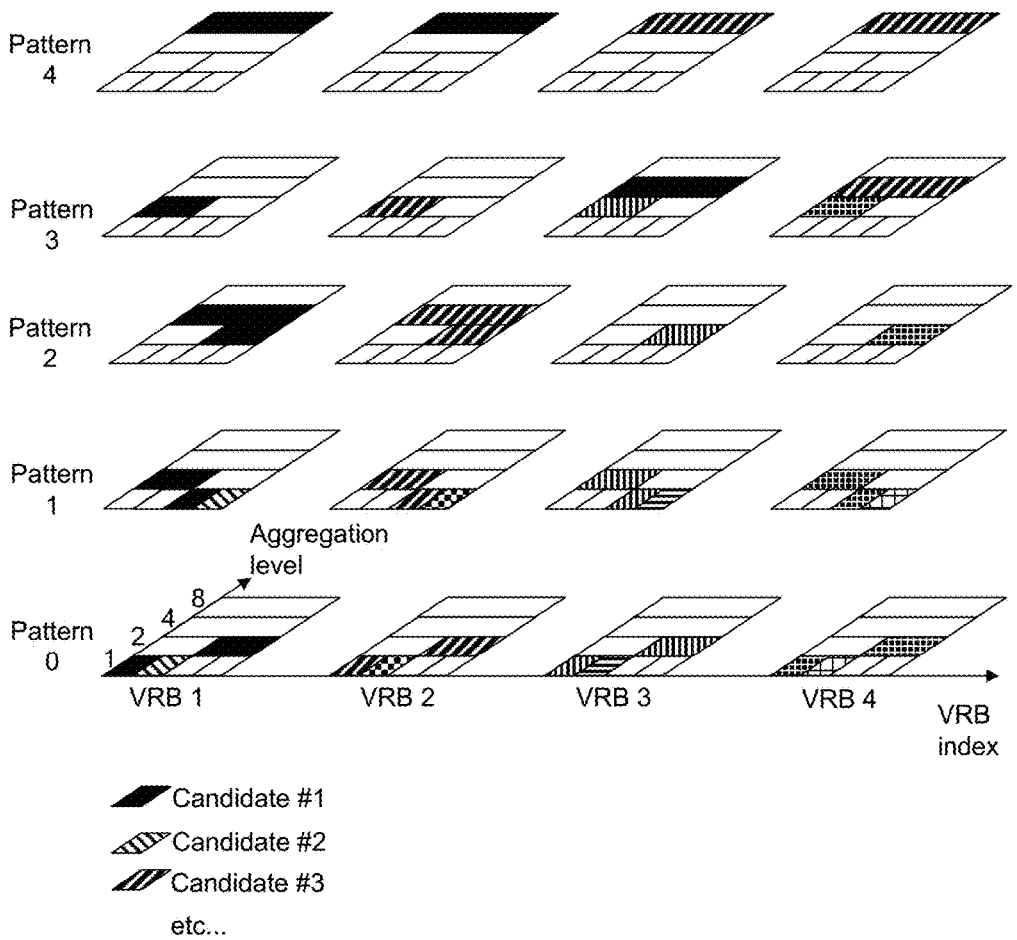

FIG. 10 schematically illustrates the combination of five potential search patterns in accordance with an embodiment of the present invention.

As can be seen pattern 0 and 1, as well as pattern 2 and 3 offer complementary candidates. This is turn allows packing of different DCI messages in the same PRB(s). Moreover, pattern 0 and 1 offer candidates for lower aggregation level, while Pattern 2 and 3 offer candidates mainly for higher aggregation levels. This is beneficial since with a limited number of blind decoding trials, different UEs can be configured with different number of lower aggregation level candidates and higher aggregation level candidates. Additionally, pattern 4 offers candidates for AL 8 so that spatial and/or frequency diversity can be obtained at least for the largest aggregation level as fallback mode. Moreover, it can be seen that the patterns are such that candidates are not overlapping on the same aggregation level.

When employing the search patterns as described above, it is possible to define a search space by configuring the patterns with the following parameters:
  pattern ID, such as pattern 0, 1, 2 and/or 3, as defined above; and/or
  antenna port, determining which DM-RS port is used to demodulate the ePDCCH; and/or
  RB set, determining on which RBs the eCCEs should be detected; and/or
  diversity configuration, determining whether e.g. LVRB, DVRB, SFBC is used for mapping on PRB.

In particular, the antenna port can be used to define the DM-RS port the pattern is mapped to, thereby defining the spatial domain. The advantage of such parameter is that it offers spatial scheduling gain thereby allowing more candidates in the spatial domain and that it offers the possibility to more candidates to avoid blocking. The RB set can be used to determine the set of RBs the pattern is mapped to thereby defining the frequency domain. The advantage of such parameter is that offers frequency scheduling gain thereby allowing more candidates in the frequency domain and that it offers the possibility to more candidates to avoid blocking as well. Finally, the diversity configuration can be used to determine whether, for instance, LVRB, DVRB, SFBC is used for mapping on PRB. The advantage of such parameter is that it offers spatial and/or frequency diversity when the channel is not known such as, for instance, when frequency/spatial selective scheduling is not feasible.

An exemplary configuration is schematically illustrated in FIG. 11, in accordance with an embodiment of the present invention.

In particular, the configuration comprises:
  a UE1 being a cell-middle UE with less accurate feedback, as in the case of FIG. 6, and configured with pattern 3 on AP8, in distributed mode, and Pattern 4 on AP7 in distributed mode; and
  a UE2 being a cell-middle UE with less accurate feedback, as in the case of FIG. 6, and configured with pattern 2 on APB, in distributed mode, and Pattern 4 on AP7 in distributed mode.

Accordingly, UE1 and UE2 being in similar conditions can use complementary patterns so as to achieve the same performances. Thanks to such configuration, AL2 and AL4 candidates of UE1 and UE2 search spaces can be multiplexed within one PRB pair since patterns 2 and 3 are complementary. Accordingly, this allows packing, in other words, multiplexing, of different DCI messages in the same PRB(s). At the same time, there is no blocking of AL2 and AL4 candidates from UE1 and UE2. Additionally, pattern 4 contains two AL8 candidates; accordingly there is no blocking of AL8 candidates from UE1 and UE2. Moreover, since AL8 candidates are configured on AP7, there is no blocking between AL8 candidates and AL2/AL4 candidates.

Accordingly, the above described configuration based on the above described patterns provides sufficient flexibility of search space configuration for different UE scenarios with limited complexity compared with full flexibility In particular, in full flexibility the number of candidates is equal to $$[N_{PRB} \cdot 4 \cdot 12 \cdot 2]^{40} = 560 \text{ bits}$$

where NPRB is the number of PRBs within the whole bandwidth. For instance, NPRB is equal to 100 for 20 MHz. 4 is the number of APs, 12 is the number of candidates within one PRB pair, and 2 is the number of diversity choices.

On the other hand, with the present invention, the number of candidates is equal to $$\binom{N_{PRB}}{4} \cdot 4 \cdot 12 \cdot 2 = 28 \text{ bits}$$

per each pattern. If a maximum of 3 or 4 patterns, for instance, is configured for one UE, then 84-112 bits are required. Accordingly, the present invention uses a very reduced signaling overhead, when compared with full flexibility approach.

Moreover, the invention supports fallback mode by obtaining frequency and/or spatial diversity at least for the largest aggregation level. Additionally, it support frequency ICIC by allowing packing of multiple DCI messages in the same PRB(s). Moreover, it avoids blocking of candidates by different DCI messages both from the same or different UE. Finally, it provides a SS framework, which allows operating various different network policies to schedule and/or configure ePDCCHs, for instance depending on operating preferences and/or deployment scenarios.

While in the above described embodiment a search space is defined by configuring a set of patterns having as parameters the antenna port, and/or the RB set and/or the diversity configuration, the present invention is not limited thereto.

Alternatively, or in addition, an applicable set of subframes can be added to the search space configuration, thereby providing a time domain diversity as well. In particular

- on high-interference subframes, and/or when common search space needs to be monitored, a larger number of higher aggregation level candidates, that is, patterns, can be configured, while
- on low-interference subframes, a larger number of lower aggregation level candidates, that is, patterns, can be configured, so as to save resources.

As an example, the set of subframes can be tied to the subset definitions for CSI reporting. Alternatively, or in addition, the set of subframe can be tied to low-power ABS subframes and non-lower-power ABS subframes.

FIG. 12 illustrates a further pattern design separated by aggregation levels in accordance with an embodiment of the present invention.

In this embodiment, the patterns are designed according to aggregation levels. In particular, each pattern contains candidates of one aggregation level. Moreover, for aggregation level 1, 2 and 4, there are two patterns that are complementary to each other. Additionally, the figure illustrates, to the right of each pattern, the corresponding number of candidates, such as Nc=8 for patterns 0 and 1.

This solution provides the benefit of a more flexible combination and configuration of the patterns.

FIGS. 13 and 14 schematically illustrate search pattern configurations in accordance with further embodiments of the present invention. In particular, in FIG. 13, a cell-center UE with less feedback is configured with pattern 0 and 1 from FIG. 10, with distributed transmission. In particular, the top part of FIG. 13 illustrates the two patterns:

SS1: Pattern 0, AP 7, VRB set 0, DVRB
SS2: Pattern 1, AP 8, VRB set 0, DVRB
while the bottom part of FIG. 13 illustrates the resulting configuration.

Additionally, in FIG. 14, a cell-center UE with less feedback is configured with pattern 2, 3 and 4 from FIG. 10, with distributed transmission. In particular, the top part of FIG. 14 illustrates the three patterns:

SS1: Pattern 2, AP 7, VRB set 0, DVRB
SS2: Pattern 3, AP 7, VRB set 0, DVRB
SS3: Pattern 4, AP 8, VRB set 0, DVRB
while the bottom part of FIG. 14 illustrates the resulting configuration.

Moreover, FIG. 15 schematically illustrates further search patterns in accordance with an embodiment of the present invention.

In particular, in FIG. 15, all the candidates within one pattern do not overlap with each other, so that there is no blocking of candidates within one pattern. Alternatively, or in addition, pattern 0 and 1, as well as 0 and 3, have complementary candidates. Further alternatively, or in addition, aggregation level 2 on pattern 3 and aggregation level 1 on pattern 0 offer complementary candidates.

The invention claimed is:

1. A transmitting apparatus comprising:
   circuitry which, in operation, maps downlink control information to at least one of a first search space or to a second search space, the first search space including a first set of PDCCH candidates corresponding to a plurality of aggregation levels, the second search space including a second set of PDCCH candidates corresponding to the plurality of aggregation levels and an aggregation level higher than any one of the plurality of aggregation levels, wherein for each of the plurality of aggregation levels a resource for each PDCCH candidate of the first set of PDCCH candidates does not overlap with a resource for any PDCCH candidate of the second set of PDCCH candidates; and
   a transmitter which is coupled to the circuitry and which, in operation, transmits the mapped downlink control information.

2. The transmitting apparatus according to claim 1, wherein
   the first set of PDCCH candidates included in the first search space are allocated for localized transmission; and
   the second set of PDCCH candidates included in the second search space are allocated for distributed transmission.

3. The transmitting apparatus according to claim 1, wherein resources for the first set of PDCCH candidates do not overlap with resources for the second set of PDCCH candidates.

4. The transmitting apparatus according to claim 1, wherein the first set of PDCCH candidates and the second set of PDCCH candidates are allocated for distributed transmission.

5. The transmitting apparatus according to claim 1, wherein at least one of the first search space and the second search space defines a smaller number of PDCCH candidates as the aggregation level gets higher.

6. A transmitting method comprising:
   mapping downlink control information to at least one of a first search space or to a second search space, the first search space including a first set of PDCCH candidates corresponding to a plurality of aggregation levels, the second search space including a second set of PDCCH candidates corresponding to the plurality of aggregation levels and an aggregation level higher than any one of the plurality of aggregation levels, wherein for each of the plurality of aggregation levels a resource for each PDCCH candidate of the first set of PDCCH candidates does not overlap with a resource for any PDCCH candidate of the second set of PDCCH candidates; and
   transmitting the mapped downlink control information.

7. The transmitting method according to claim 6, wherein
   the first set of PDCCH candidates included in the first search space are allocated for localized transmission; and
   the second set of PDCCH candidates included in the second search space are allocated for distributed transmission.

8. The transmitting method according to claim 6, wherein resources for the first set of PDCCH candidates do not overlap with resources for the second set of PDCCH candidates.

9. The transmitting method according to claim 6, wherein the first set of PDCCH candidates and the second set of PDCCH candidates are allocated for distributed transmission.

10. The transmitting method according to claim 6, wherein at least one of the first search space and the second search space defines a smaller number of PDCCH candidates as the aggregation level gets higher.

* * * * *